(12) United States Patent
Bacher et al.

(10) Patent No.: US 7,275,703 B2
(45) Date of Patent: Oct. 2, 2007

(54) METHOD FOR PROCESSING SYNTHETIC MATERIALS FOR THE PURPOSE OF RECYCLING

(75) Inventors: Helmut Bacher, Florian (AT); Helmuth Schulz, Linz (AT); Georg Wendelin, Linz (AT)

(73) Assignee: EREMA Engineering Recycling Maschinen und Anlagen Gesellschaft m.b.H, Ansfelden (AT)

( * ) Notice: Subject to any disclaimer, the term of this patent is extended or adjusted under 35 U.S.C. 154(b) by 0 days.

(21) Appl. No.: 10/558,135

(22) Filed: Nov. 22, 2005

(65) Prior Publication Data
US 2007/0007375 A1   Jan. 11, 2007

Related U.S. Application Data

(63) Continuation of application No. 10/588,135, filed as application No. PCT/AT2004/000167 on May 11, 2004.

(30) Foreign Application Priority Data
Jun. 5, 2003   (AT) ................ A 886/2003

(51) Int. Cl.
 *B02C 15/00* (2006.01)
(52) U.S. Cl. ................ 241/152.2; 241/199.2
(58) Field of Classification Search .......... 241/199.2, 241/101.8, 236, 152.2, 260.1
See application file for complete search history.

(56) References Cited

U.S. PATENT DOCUMENTS 4,951,883 A * 8/1990 Loppoli et al. ....... 241/101.762

5,622,323 A * 4/1997 Krueger et al. ........ 241/101.76
5,984,218 A * 11/1999 Peat ....................... 241/260.1

FOREIGN PATENT DOCUMENTS

| EP | 1173315 A | 1/2002 |
|---|---|---|
| WO | WO 01/39948 A | 6/2001 |

* cited by examiner

*Primary Examiner*—Faye Francis
(74) *Attorney, Agent, or Firm*—Townsend and Townsend and Crew, LLP

(57) ABSTRACT

A device for the preparation of, preferably thermoplastic, plastics material for recycling purposes has a container (1) in which at least one rotating mixing and/or comminuting tool (14) is arranged. The material thus treated is fed through an outlet opening (17) which is arranged at the bottom of the container (1) and to which the feed opening (18) of a housing (19) is fluidly connected. In this housing are arranged at least two screws (21, 22) which are jointly charged with material. The diameter (D) of the container (1) and the diameter (d) of each of the screws (21, 22) are in the relationship $$D=10^3\sqrt[3]{d^2K},$$

where
D is the inner diameter of the circular cylindrical container (1) or the inner diameter of a hypothetical circular cylindrical container converted to the same capacity and having the same effective height,
d is the screw diameter, and
K is a constant greater than or equal to 50.

16 Claims, 4 Drawing Sheets

METHOD FOR PROCESSING SYNTHETIC MATERIALS FOR THE PURPOSE OF RECYCLING

BACKGROUND OF THE INVENTION

The invention relates to a device for the preparation of plastics material for recycling purposes, in particular thermoplastic plastics material, comprising a container which has an inlet opening at the top for the material to be processed, wherein at least one movable mixing and/or comminuting tool is arranged in the container and preferably rotates about the vertical container axis, and the material treated by this tool is fed through an outlet opening which is arranged at the bottom of the container and to which the feed opening of a housing of an apparatus, preferably a plasticizer or agglomerator, is fluidly connected, the apparatus comprising a screw.

Devices of this type are known, e.g. EP 1 173 315 or WO-A-01/39948, wherein the plasticizer or agglomerator usually has an extruder screw which feeds the material conveyed by it directly to the following processing stage, usually a granulator. However, the screw can also be a simple conveyor screw which feeds the material to a following processing step, e.g. further processing by means of rotating tools. Only after this processing step is the material fed to a plasticizer or agglomerator. Essentially, the known devices operate satisfactorily, but frequently have difficulties when charging the apparatus connected to the outlet opening, in particular when this apparatus is a plasticizer or agglomerator. The infeed to the screw should be as uniform as possible and the delivery from this apparatus should also be as uniform as possible, which is of particular importance when a molding plant is connected to an extruder. In the case of a molding plant, it is important that the material to be molded is supplied as uniformly as possible. The aforementioned difficulties are caused, among other things, by the fact that the material to be processed usually varies greatly, both with respect to the chemical composition of the material and with respect to its external constitution (degree of soiling, particle size, particle shape, etc.).

SUMMARY OF THE INVENTION

An object of the present invention is to overcome these difficulties and improve a device of the initially described type in such a way that the material to be processed is fed as uniformly as possible to the apparatus connected to the outlet opening so that a uniform output is achieved at the delivery end of the screw, in particular of a plasticizer or agglomerator. The invention achieves this object in that the housing of the apparatus connected to the outlet opening contains at least two screws which are jointly charged with material coming from the container and in that the diameter D of the container and the diameter d of each of the screws are in the following relationship:

$$D = 10^3 \sqrt[3]{d^2 K},$$

where

D is the inner diameter of the circular cylindrical container in mm or the inner diameter of a hypothetical circular cylindrical container converted to the same capacity and having the same effective height, d is the screw diameter in mm, and K is a constant greater than or equal to 50.

Therefore, instead of the conventional single-screw designs, the transition is made to a twin-screw or multi-screw design within the framework of the invention. With respect to twin-screw extruders, the relatively high costs previously had to be considered, but it is the inventors' experience that the complicated measures which were necessary in single-screw designs in order to achieve some degree of uniform infeed behavior come close to the cost of a twin-screw design. In addition, the screws and barrels of twin-screw barrel designs can be substantially shorter than in single-screw designs, and approximately 1.5 to 2 times the output is achieved with the same screw diameter (e.g. in polyethylene processing).

In this connection, however, the aforementioned dimensioning of the container is important in order to ensure the aforementioned uniform charging of the screws.

This construction according to the invention produces a constant infeed of the processing material to the screws, even when the material in the container is softened through heating. As the screw length can be kept shorter than in single-screw designs, shorter by approximately half in a twin-screw design, substantially less space is required for the same output of the device. Better plasticizing properties are produced in the wedge region of the screws because there the material is particularly intensively worked by shearing and kneading. It has also been shown, with respect to the screw geometry, that this type of design is less sensitive to the processing of different types of plastics, with the result that the device is more universally usable.

A further advantage of the design according to the invention lies in the fact that the cooled grooved sleeve, which has hitherto usually been necessary in the infeed region and which is subjected to considerable wear, is no longer required. This not only represents a cost saving, but also brings with it the advantage of a lower starting torque for the drive motor.

Within the framework of the invention, K is preferably greater than 100, as experience has shown.

It has also been shown, within the framework of the invention, that the charging of the apparatus formed by the screws and their housing, in particular if it is formed by a plasticizer or agglomerator, improves as the path that the processing material has to cover from the container to the screws is reduced. Therefore, according to a further development of the invention, the design is such that the housing of the plasticizer or agglomerator is directly connected to the outlet opening of the container so that the feed opening of the housing of the plasticizer or agglomerator is directly adjacent to the outlet opening of the container or coincides therewith. For this purpose, it is advantageous if the housing of the two screws is connected tangentially to the circumference of the container, although different arrangements are in principle also possible, e.g. a radial arrangement.

The most favorable arrangement within the framework of the invention is produced when the cross-sections of the screws in the housing of the plasticizer or agglomerator lie vertically or obliquely above one another in the region of the feed opening. The vertical arrangement produces the shortest paths of the processing material from the container to the screws. If there is a departure from this, e.g. with an oblique arrangement of the screw cross-sections or even a side-by-side arrangement, it is then usually necessary to cool the resulting surface in the housing of the plasticizer or agglomerator in the region of the feed opening and to provide cooling ducts for this purpose in order to prevent accumulated material from adhering to this surface.

The turns of the screws can mesh with one another at least in the region of the feed opening. This has the advantage of self-cleaning of the screw turns, which is particularly important in the infeed region. Although equal diameters of the two screws are advantageous, this is not absolutely necessary, and the two screws can also have different lengths, e.g. when one screw acts as a feed screw for the other screw. In the case of different screw diameters, the average value of the screw diameters is to be taken for d in the above formula. If the screw diameter is not constant over the length of the screw (e.g. in conical screws), then the average screw diameter is to be used.

The initially mentioned advantageous infeed behavior of the material to be processed is further improved, within the framework of the invention, in that the side wall of the feed opening, at which the tool discharges, defines a widening of the feed opening, the widening extending continuously towards the longitudinal axis of the housing of the screws and, seen in the direction of the axis of the housing of the screws, extending at least as far as the circumference of the turns of the adjacent screw, preferably into the region of the screw axis, so that this widening forms an uninterrupted shearing edge cooperating with these screw turns. In particularly advantageous embodiments, the side wall defining the widening of the feed opening forms an angle of 20° to 80°, preferably 30° to 55°, with the screw axis. Experiments have also shown that it is particularly advantageous for the aforementioned infeed behavior if the following formulae apply to the feed opening of the housing of the screws:

$$h \geq k0.6\ d \text{ and}$$

$$L \geq k0.6\ d,$$

where h is the effective height of the feed opening in mm, measured in the axial direction of the container, L is the effective length of the feed opening in mm, measured in the circumferential direction of the container, d is the outer diameter of the screws in mm, and k is the number of screws, k preferably being 2.

Furthermore, it is advantageous if the base of the feed opening slopes downwards from the screws towards the container.

Further features and advantages of the invention will become apparent from the description of embodiments of the subject of the invention, which are shown in the drawings.

DESCRIPTION OF THE PREFERRED EMBODIMENTS

Figure 1:
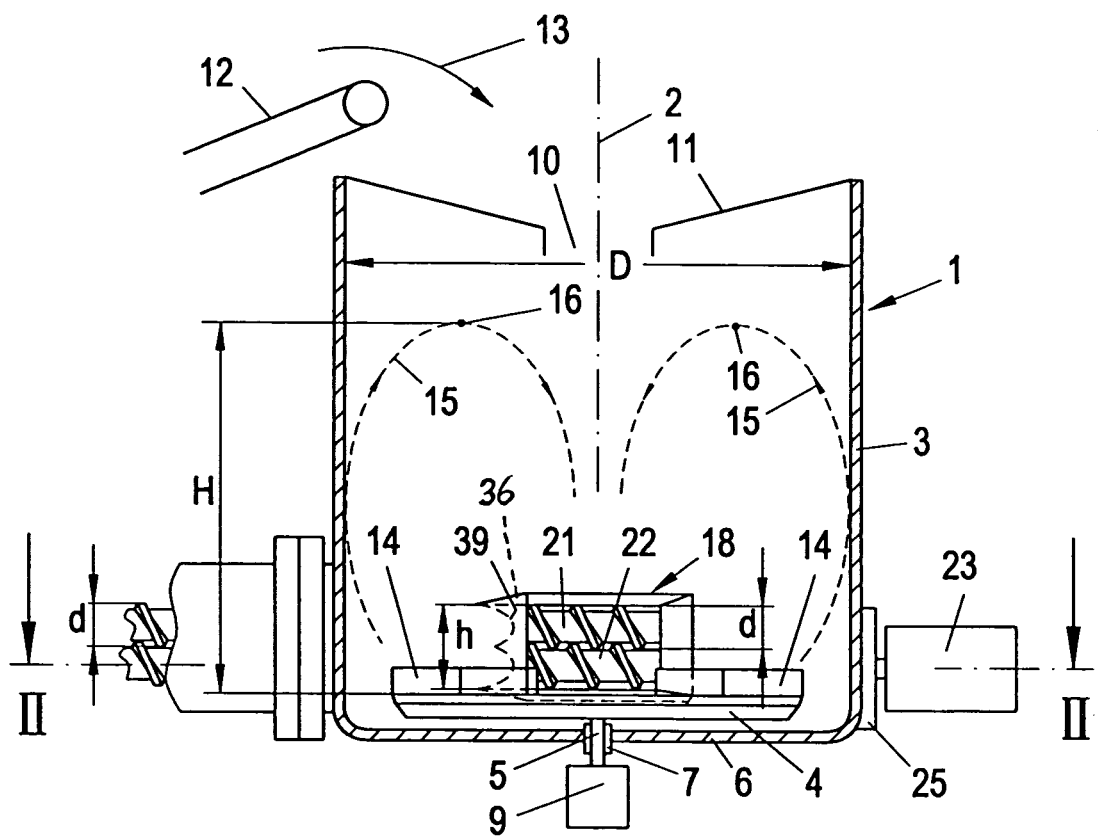
FIG. 1 shows a vertical section through a first embodiment taken along line I-I in FIG. 2, which shows a section taken along line II-II in FIG. 1.

In the device according to FIGS. 1, 2, 6 and 7, the device forms a shredder/extruder combination with a twin screw and has a container 1 with a vertical axis 2 and a circular cross-section, the side wall 3 of which extends substantially cylindrically. A carrier plate 4 rotates about the axis 2 in the container 1 in the direction of the arrow 8 (FIG. 2) and sits on a shaft 5 which extends through the base 6 of the container 1 in a sealed manner and is rotatably mounted in the base 6 in bearings 7. The shaft 5 is rotatably driven by a motor 9.

The top of the container 1 has an inlet opening 10 for the material to be processed, advantageously in a funnel-shaped covering wall 11. If the material is to be processed under vacuum, an evacuator is connected to the container 1, and the inlet opening 10 is provided with a sluice which can advantageously also be evacuated. The material to be processed is fed to the inlet opening 10 by a feeder 12, e.g. a conveyor belt, and dropped into the opening 10 in the direction of the arrow 13.

Figure 3:
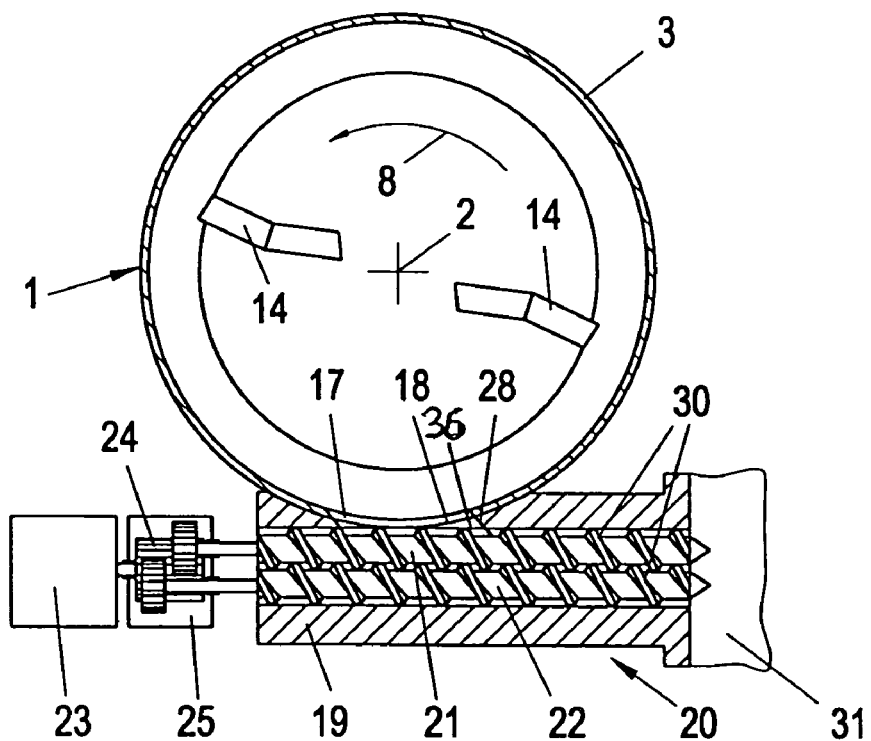
FIG. 3 shows an embodiment in horizontal section with screws of equal length lying side by side.
Figure 4:
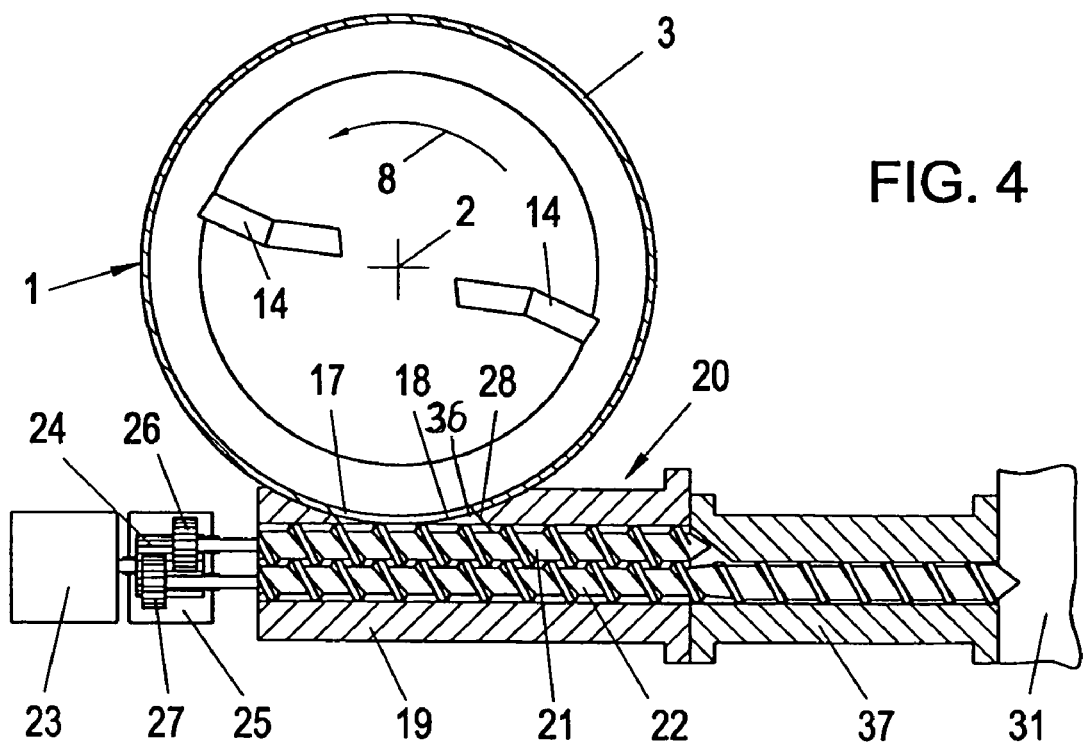
FIG. 4 shows a variation of the embodiment in FIG. 3, in which the two screws have different lengths.

The carrier plate 4, arranged in the region of the base 6, carries a plurality of tools 14 which at least have a mixing effect on the material introduced into the container 1, usually thermoplastic material for recycling, and usually also comminute and dry the material. In the latter case, the tools 14 are formed as cutters with blades. The material spun off from the tools 14 of the carrier plate 4 rises up the side wall 3 of the container 1 in the form of a mixing vortex 15 and, after reaching a culmination point 16, falls back into the region of the container axis 2. In this way, the processed material is thoroughly mixed or comminuted and dried and, after an adequate residence time in the container 1, is discharged from the latter through an outlet opening 17 which, in the embodiment shown, coincides with the feed opening 18 of the housing 19 of a plasticizer or agglomerator 20, in the present case an extruder, but is at least fluidly connected to the feed opening 18. The apparatus 20 has two screws 21, 22 which are arranged in the housing 19 and which are synchronously driven in the same direction of rotation by a motor 23 so that their screw turns can mesh with one another. A possible drive arrangement suitable for this is shown in FIGS. 3 and 4. The motor 23 drives a sun gear 24 which is mounted in a transmission housing 25 and which drives two planet gears 26, 27 connected in a rotationally fixed manner to the shafts of the two screws 21, 22.

To obtain double the output quantity in comparison with a single-screw extruder, it has been shown that the container dimensions have to satisfy the relationship according to the following, empirically determined rule of thumb:

$$D = 10^3 \sqrt{d^2 K},$$

where D is the inner diameter of the container 1 in mm, d is the outer diameter of the turns of the two screws 21, 22 in mm, and K is a constant which is at least 50, but preferably at least 100. This formula applies to a circular cylindrical container. If this container is not circular cylindrical or not cylindrical, e.g. conical, D has to be converted to the inner diameter of a hypothetical circular cylindrical container of the same capacity, i.e. the same effective height. The effective height H is regarded as the distance of the culmination point 16 of the mixing vortex 15 above the upper edge of the carrier plate 4, provided that the operating conditions are suitable.

In many cases, however, the size and shape of the feed opening 18 of the screw housing 19 are also important. The plastics material which is mixed in the container 1, optionally comminuted, and thereby heated and optionally dried, is cast by the tools 14 into this feed opening, which lies at least in part at the level of the tools 14 rotating in the container 1. This can be assisted by the leading edges of the tools—seen in arrow direction 8—being angled or bent counter to the direction of movement so that a spatula-type pressing action of the material into the feed opening 18 takes place during rotation of the tools 14. Experiments have shown that conditions are particularly favorable if the following measurements apply to the feed opening 18:

$$h \geq k0.6 \, d \text{ and}$$

$$L \geq k0.6 \, d,$$

where h is the effective height of the feed opening 18 in mm, measured in the axial direction of the container 1, L is the effective length of the feed opening 18 in mm, measured in the circumferential direction of the container 1, d is the outer diameter of the screw turns in mm, and k is the number of screws, k preferably being 2.

The effective clear cross-section in relation to the direction of passage of the material from the container 1 into the housing 9 counts as the effective length or effective height of the feed opening 18.

Figure 2:
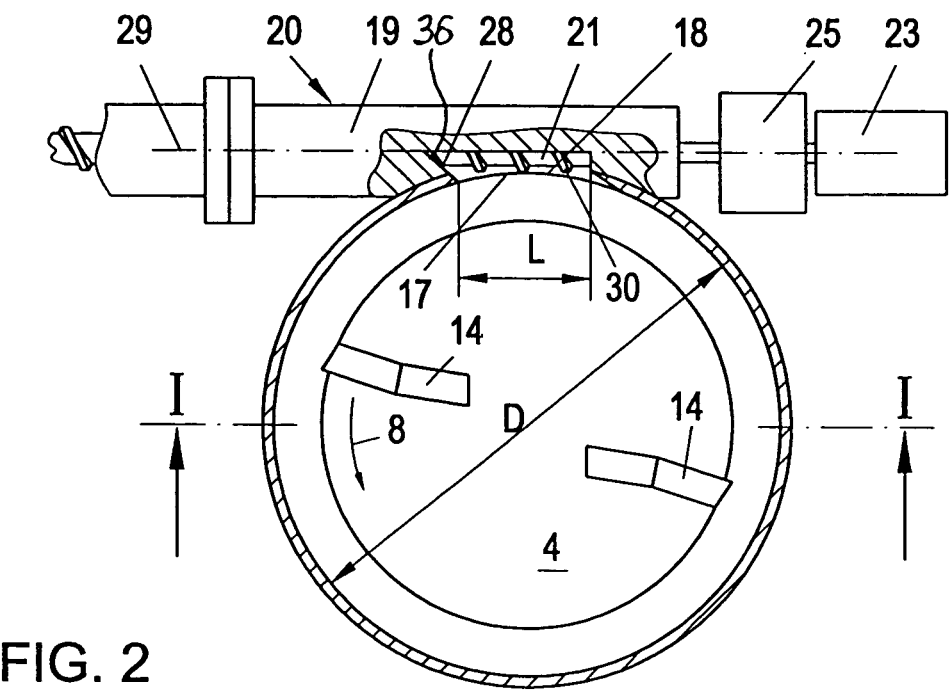

Furthermore, experiments have shown that the material introduced into the feed opening 18 has the tendency from time to time to accumulate in the region of that edge of the feed opening 18 at which the tools 14 discharge, i.e. the left-hand edge of the feed opening 18 in FIG. 2. In order to avoid this accumulation, it has proved advantageous to arrange that side wall 28 of the feed opening 18 at which the aforementioned tools 14 discharge (this is the side wall 28 lying on the right in FIGS. 3 and 4) obliquely in relation to the longitudinal axis 29 of the screw housing 19 so that, seen in the infeed direction of the plastics material, a widening 36 of the feed opening 18 is formed which extends continuously towards the screw axis. The angle α (FIG. 7), which this side wall 28 forms with the longitudinal axis 29 of the screw housing 19, is in any case less than 90°, especially 20° to 80°, preferably 30° to 55°. The side wall 28 extends at least as far as the circumference of the screw turns 30 of the adjacent screws 21 or 22, preferably into the region of the axis of this screw. With a vertical arrangement of the two screws 21, 22, seen in plan view, this longitudinal axis of the screw coincides with the axis 29 of the screw housing 9 (FIG. 2). The edge of this side wall 28, in particular its end, forms a shearing edge 39 (FIGS. 1, 5, 6) which cooperates with the screw turns 30 and which, because a grooved sleeve is not provided, extends continuously, i.e. without interruption, in the circumferential direction of the screws 21, 22.

Figure 7:
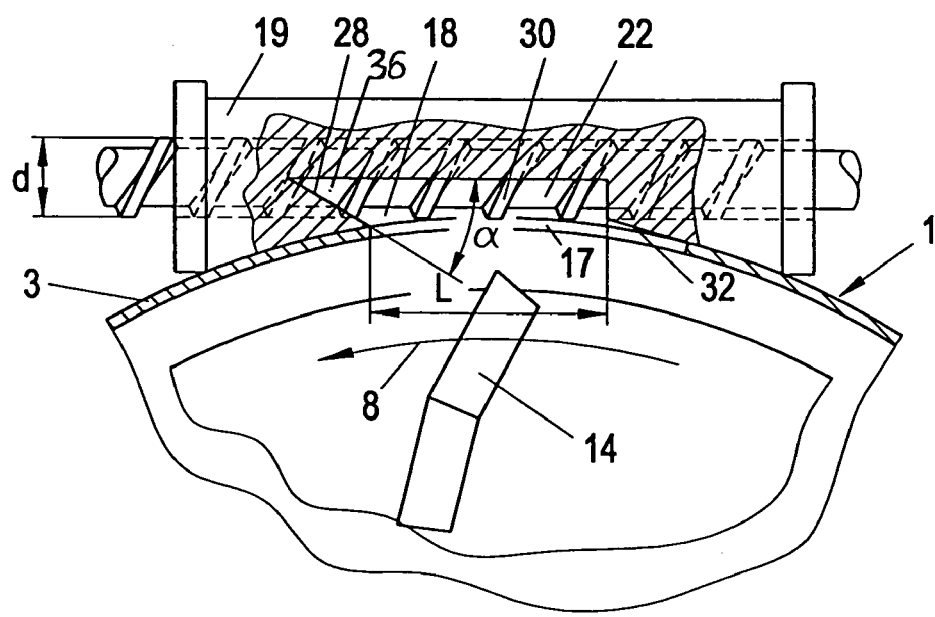
FIG. 7 shows the formation of the feed opening in horizontal section.
Figure 8:
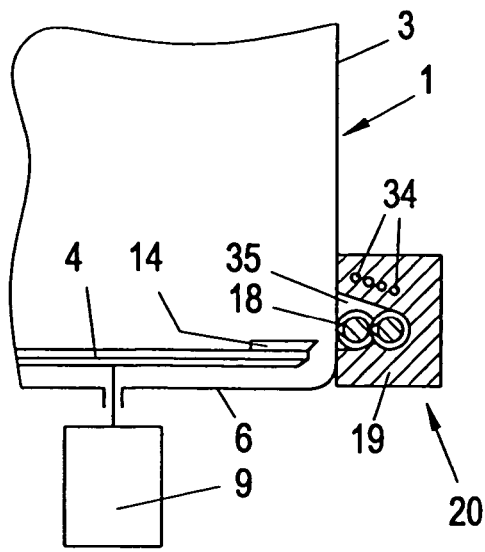
FIGS. 8-14 show different variations for the arrangement of the screws, in each case in vertical section.
Figure 9:
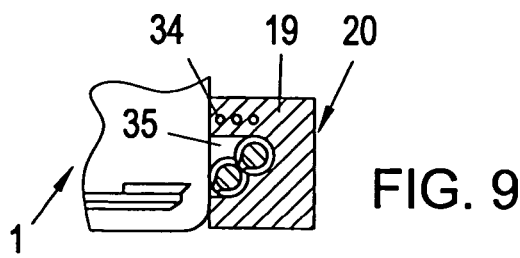
Figure 10:
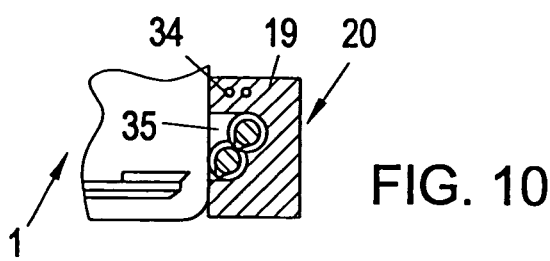

In the embodiment according to FIGS. 1, 2 and 7, the two screws 21, 22 are arranged vertically above one another, and the screw axes lie horizontally. The two are not absolutely necessary, although these arrangements are the most favorable. If there has to be a departure from this, the two screws 21, 22 can lie horizontally side by side, as FIGS. 3 and 4 show. In the embodiment according to FIG. 3, the two screws 21, 22 are of equal length and driven in the same direction of rotation; their screw turns 30 can mesh with one another. The two screws 21, 22 therefore feed jointly into an extruder head 31 connected to the screw housing 19.

The arrangement according to FIG. 4 differs from that according to FIG. 3 in that the two screws 21, 22 have different lengths; namely the screw 21 adjacent to the container 1 is shorter than the other screw 22. The screw 21 therefore takes up the material cast out of the container 1 through its outlet opening 17 and into the feed opening 18 of the screw housing 19, this infeed behavior being improved by the aforementioned dimensioning of the container 1 and the feed opening 18 and also by the formation of the side wall 28 of the same. During its conveying action, the screw 21 transfers the material taken up by it to the other screw 22, which feeds the material to the connected extruder head 31. Apart from the advantage of a uniform infeed, this arrangement has the further advantages of a cheaper delivery housing 37 and a cheaper inlet piece leading to the extruder head 31.

Figure 6:
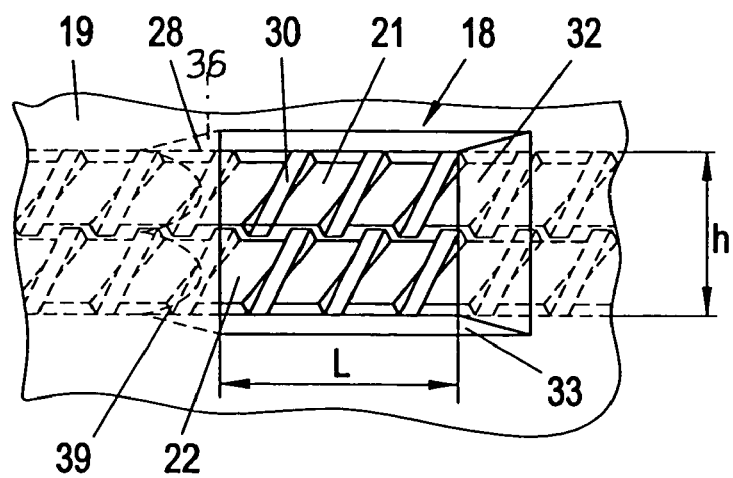
FIG. 6 shows the formation of the feed opening in an arrangement according to FIG. 1.

FIG. 6 shows in more detail the formation of the feed opening 18 for designs according to FIGS. 3 and 4.

Figure 5:
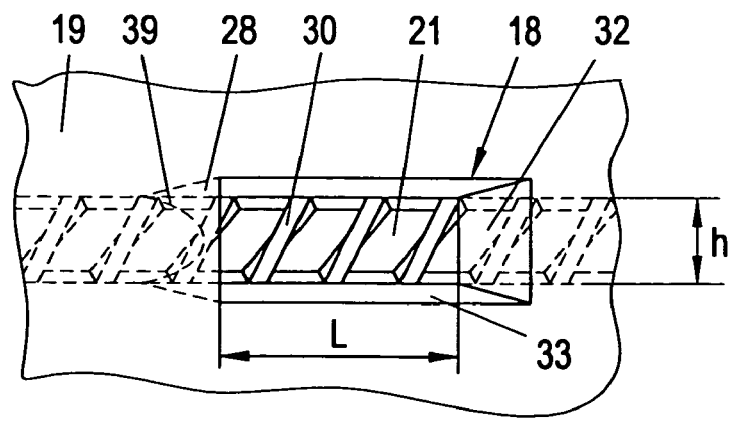
FIG. 5 shows the formation of the feed opening in an arrangement according to FIG. 3.

It can be seen from FIGS. 5, 6 and 7 that a chamfer 32 is also provided on that edge of the feed opening 18 at which the tools 14 discharge, i.e. the right-hand edge in FIGS. 5, 6 and 7, in order to improve the infeed behavior. Furthermore, the base 33 of the feed opening 18 is inclined towards the container 1 so that the wall—formed by the base 33—of the feed opening slopes downwards from the screw 22 towards the container 1.

Figure 11:
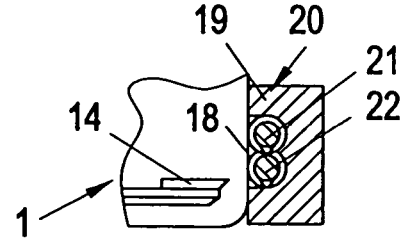
Figure 12:
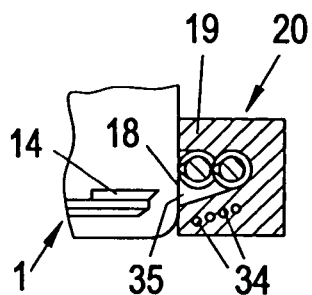
Figure 13:
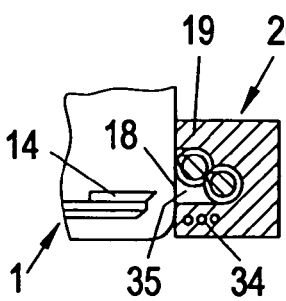
Figure 14:
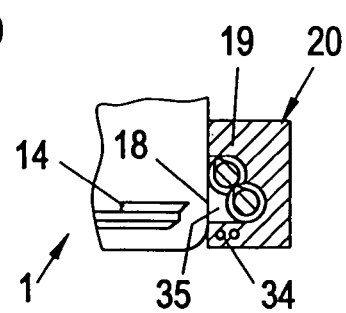

As already mentioned, the two screws 21, 22 can in principle adopt any position relative to one another. Various arrangements are shown in FIGS. 8-14. The position of the two screws 21, 22 vertically above one another as shown in FIG. 11 is the most advantageous arrangement because then there is no risk of plastics particles adhering to the surface of the infeed region of the screw housing, unlike in other positions of the screws 21, 22.

Arrangements deviating from the arrangement according to FIG. 11 are in principle also usable, but in these arrangements the aforementioned adhesion of e.g. sticky plastics particles and the resultant blockage of the charging opening are possible. This can lead to overheating of these material particles. In order to avoid this, it is recommended, for arrangements of the screws 21, 22 deviating from FIG. 11, to provide cooling ducts 34 in the region of that portion of the housing 19 which is defined by the feed opening 18, where cavities 35 are located adjacent to the feed opening 18, which cavities 35 can lead to the aforementioned adhesion and the resulting excessively long residence times of the worked material particles. The larger these cavities 35 are and the further they extend into the housing 19 away from the container 1, the more cooling ducts 34 necessarily have to be provided.

Figure 15:
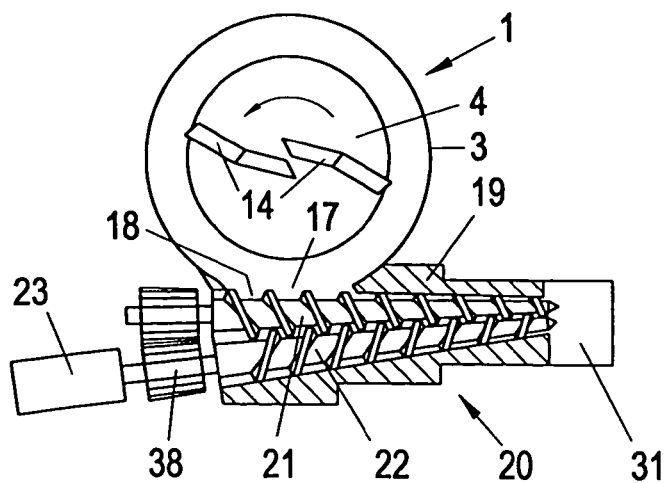
FIG. 15 shows a horizontal section through an arrangement with a conical twin-screw extruder.

Although the formation of the two screws 21, 22 with an equal and constant turn diameter d (FIG. 7) is the most favorable on grounds of cost, this is not absolutely necessary. FIG. 15 shows an embodiment with two screws 21, 22 which are both conically formed and together form a twin-screw extruder which feeds into an extruder head 31. The two screws 21, 22 are driven in opposite directions by a common motor 23 via mutually meshing gears 38. Their screw turns 30 can mesh with one another so that self-cleaning in the infeed region is also achieved in this embodiment.

Although the horizontal arrangement of the housing 19 having the screws 21, 22 is the most favorable, it is possible in principle to connect this housing with an inclined longitudinal axis to the container 1, if necessary even vertically.

Although, in the above-described embodiments, only two screws are shown in each case, designs with three or more screws are theoretically also possible in an analogous construction. The aforementioned formulae also apply to these designs. For economic reasons, however, designs of this type provided with three or more screws are not of great significance.

The invention claimed is:

1. A device for the preparation of plastics material for recycling purposes comprising a container which has an inlet opening at the top for the material to be processed, wherein at least one movable mixing and/or comminuting tool is arranged in the container, and the material treated by this tool is fed through an outlet opening which is arranged at the bottom of the container and to which the feed opening of a housing of an apparatus comprising at least two screws is fluidly connected, the at least two screws being jointly charged with material coming from the container, a diameter of the container and a diameter of each of the screws having the following relationship:

$$D \div 10^3 \sqrt{d^2 K},$$

where
D is the inner diameter of the circular cylindrical container in mm or a theoretical inner diameter of a circular cylindrical container converted to the same capacity and having the same effective height,
d is the screw diameter in mm, and
K is a constant greater than or equal to 50.

2. A device according to claim 1, wherein K is greater than 100.

3. A device according to claim 1, wherein the housing of the apparatus comprising the screws is directly connected to the outlet opening of the container so that a feed opening of the housing of this apparatus is directly adjacent to the outlet opening of the container or coincides therewith.

4. A device according to claim 3, wherein the housing of the two screws is connected tangentially to the circumference of the container.

5. A device according to claim 4, wherein the cross-sections of the screws in the housing lie vertically or obliquely above one another in the region of the feed opening.

6. A device according to claim 5, wherein cooling ducts are provided in the housing of the screws in the region of the feed opening.

7. A device according to claim 3, wherein the side wall of the feed opening, at which the tools discharge, defines a widening of the feed opening, the widening extending continuously towards the longitudinal axis of the housing of the screws and, seen in the direction of the aforementioned longitudinal axis, extending at least as far as the circumference of the turns of the adjacent screw so that this widening forms an uninterrupted shearing edge cooperating with these screw turns.

8. A device according to claim 7, wherein the widening extends into the region of the screw axis.

9. A device according to claim 7, wherein the side wall defining the widening of the feed opening forms an angle between 20° and 80° with the longitudinal axis of the screw housing.

10. A device according to claim 9 wherein the angle is between 30° and 55°.

11. A device according to claim 1, wherein the apparatus comprising the screws is a plasticizer or agglomerator.

12. A device according to claim 1, wherein the turns of the screws mesh with one another at least in the region of the feed opening.

13. A device according to claim 1, wherein the mixing and/or comminuting tool rotates about the vertical container axis.

14. A device according to claim 1, wherein the following formulae apply to the feed opening of the housing of the screw(s):

$$h \geq k0.6\ d \text{ and}$$

$$L \geq k0.6\ d,$$

where
h is the effective height of the feed opening in mm, measured in the axial direction of the container,
L is the effective length of the feed opening in mm, measured in the circumferential direction of the container,
d is the outer diameter of the screw turns in mm, and
k is the number of screws, k preferably being 2.

15. A device according to claim 14, wherein the base of the feed opening slopes downwards from the screws towards the container.

16. A device according to claim 1 wherein the plastics material comprises thermoplastic waste plastics material.

* * * * *